July 19, 1960 C. R. CARYL ET AL 2,945,417

APPARATUS AND MECHANISM FOR CONCENTRATING SOLAR RAYS ON OBJECTS TO BE TESTED

Filed May 12, 1958

COLEMAN R. CARYL,
WALTER E. HELMICK,
INVENTORS

BY Scott L. Norviel

ATTORNEY

United States Patent Office 2,945,417 Patented July 19, 1960

2,945,417

APPARATUS AND MECHANISM FOR CONCENTRATING SOLAR RAYS ON OBJECTS TO BE TESTED

Coleman R. Caryl, Maricopa County, near Phoenix, Ariz. (7740 N. 15th Ave., Phoenix, Ariz.), and Walter E. Helmick, 920 Roxbury Road, San Marino, Calif.

Filed May 12, 1958, Ser. No. 734,681

1 Claim. (Cl. 88—14)

This invention concerns apparatus and mechanism for concentrating solar energy on samples of material to determine changes in their physical properties.

More particularly the invention concerns concentrating apparatus for solar energy to determine changes in the physical properties of materials exposed to the concentrated solar rays and for moistening the materials being tested by either the direct application of water or by the application of moistened air.

This concentration of solar energy has been found to greatly increase the speed of those changes, such as the fading of colors, the degradation of various plastics, the failure of paint.

One of the objects of the invention is to provide a means for concentrating the rays of the sun upon the samples to be tested so that the samples will be subjected to the concentrated rays throughout the maximum number of hours of each day;

Another object is to provide a device which will include a set of mirrors adapted to concentrate the sun's rays by reflection upon a group of samples to be tested, as to the permanency of their properties and of their color; said apparatus being adapted to move with the sun to maintain the constancy of the concentrated rays on the samples and having means for keeping the samples cool so that the effects of concentrated heat rays will be minimized as to the permanency of their properties and of their color;

Still another object is to provide apparatus for concentrating the sun's rays on the number of samples of material to be tested and at the same time providing means including a draft of cool or cooled and moistened cooled air, to reduce the heat produced by the concentration of all of the sun's rays and to prevent decomposition of the material or any coloring matter therein, due to the heat rays, or the like, in the solar spectrum;

A still further object is to provide method and apparatus for applying concentrated rays of the sun to samples of materials to be tested, so as to shorten the time necessary for tests; said rays being applied to the materials so as to obtain the results of the shorter wave length of the solar spectrum and counteract the effects of the heat rays of the solar spectrum, such as the infra red rays, etc. The tests made by this apparatus being arranged so that the effects of the ultraviolet rays and mixed visible rays are separated from the effects that might be obtained from the infra red and heat rays.

Other objects will appear hereinafter.

The above objects are attained by use of the apparatus and mechanism shown in the accompanying drawing in which—

Similar numerals refer to similar parts in the several views.

Figures 1, 2, 3, 4:
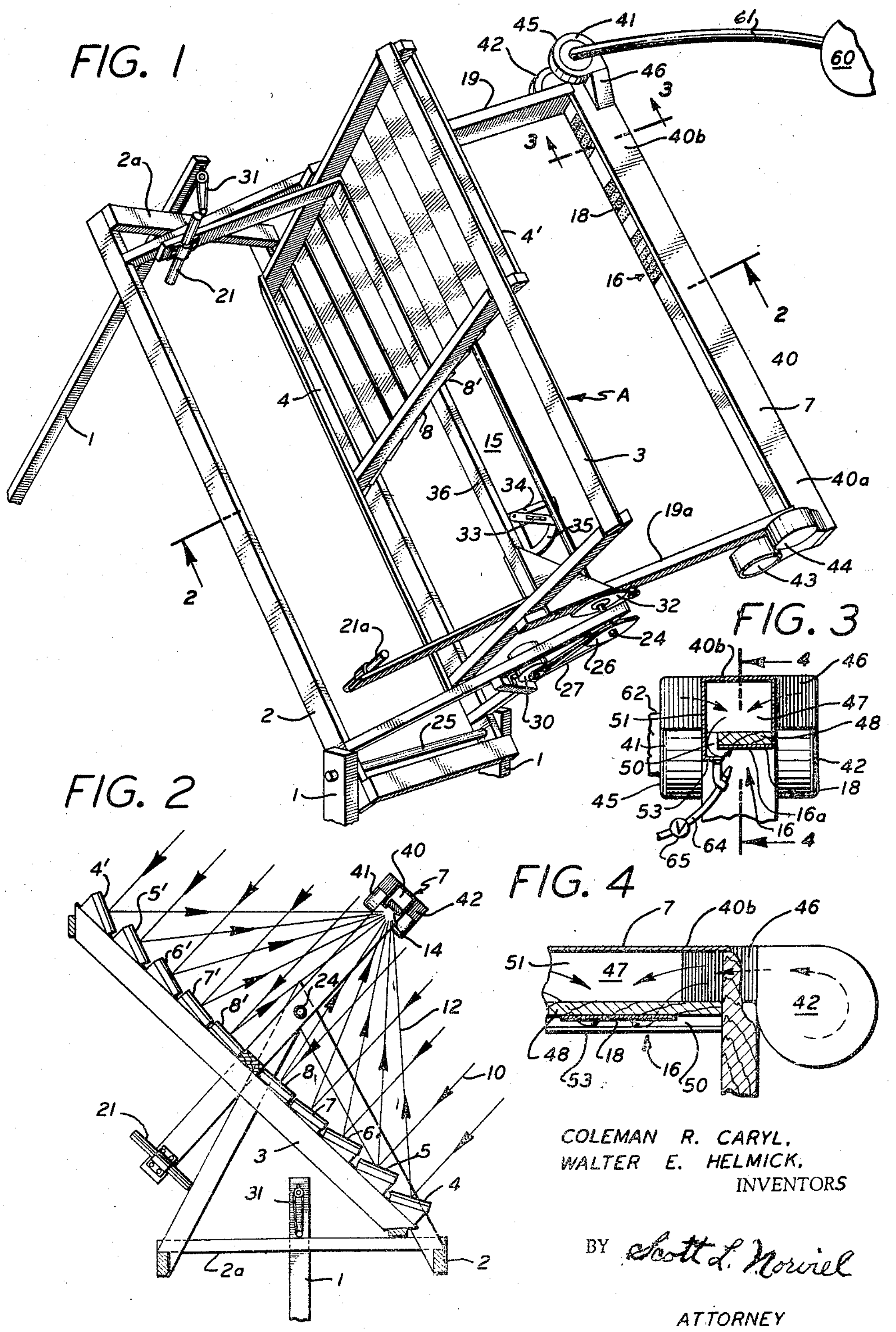
Figure 1 is a perspective view of the complete apparatus, except for the foundation parts of the supporting members.
Figure 2 is a section of the apparatus shown in Figure 1, taken substantially on line 2—2 of Figure 1.
Figure 3 is a sectional view of an end portion of the target area and the supporting parts thereof as well as the cooling apparatus, taken substantially on line 3—3 of Figure 1.
Figure 4 is a transverse sectional view of the apparatus shown in Figure 3; said section being taken substantially on line 4—4 of Figure 3.

The apparatus for concentrating rays of the sun includes a base frame 2 which is rectangular in shape and which supports a rectangular mirror frame 3. This frame holds the mirrors 4 through 8, on each side of its center, and angles, shown in Figure 2, so that the rays of the sun, indicated by numeral 10, will be reflected at angles indicated by the lines 12 so that they converge substantially on the face 14 of the target testing area 16. This target testing area extends the full length of the apparatus and has a width sufficient to accommodate various flat samples, such as 18, of material or surfaces to be tested.

Optionally mirrors 4 through 8 may be replaced by a properly curved mirror of coated glass or metal.

As shown, only one frame of mirrors 4 is shown in Figure 1. It is to be understood that mirrors may be added to the vacant area 15 at the lower end portion of the frame 3. It is also to be noted that the target holder 7 is supported on upright struts 19 and 19*a* which extend from the center of the frame 3. On the under side of frame 3 there are counter-balances 21 and 21*a*. These are proportioned so that the frame 3 carrying the mirrors 4 through 8, and 4′, 5′, 6′, 7′ and 8′ will be balanced relative to the weight of the target support 7. This group of apparatus, indicated by the letter A, is pivotally supported on a shaft 24 which runs through the struts 19 and 19*a*. At the lower end of the shaft there is a sprocket or pulley 26 driven by a belt or chain 27 through adequate gearing by a motor 30. This motor is made to operate at a speed so that the frame 3 will carry the mirrors throughout the arc of the travel of the sun from dawn to sunset. A clutch 32 couples the frame 3 to shaft 24, and when released permits the setting of the frame 3 in the proper position at any desired time.

Variations of the angle of the shaft 24 are made, to accommodate the apparatus to the daily change in the sun's declination angle during the year, and latitude of the position of the apparatus by raising or lowering the upper end 2*a* of frame 2, by means of the mechanism shown, including rope and pulleys 31 on shaft 25. By shortening the ropes of this device the angle which the frame 2 bears to the vertical may be adequately adjusted. The frame 2 is supported by several members 1, set in the ground or secured to any substantial structure.

This angle may be indicated by the bubble levelling element 33 placed on a pivotal base 34 which is attached to the sector support 35 which is in turn attached to the lower frame strut 36 of the vertical frame A. Thus, it is observed that the vertical frame which carries the target area 16 within the top member 7 includes the lower member of the frame 36, the vertical end members 19 and 19*a* and the top member generally indicated by numeral 7.

The top member 7 is composed of a hollow tube 40. This is made to act as an air duct. Air is furnished to the duct through the blowers 41 and 42 at the upper end 40*b* and by blowers 43 and 44 at the lower end 40*a*. These blowers are all driven by electric motors (not shown) and contained within their outer cases 45.

Wetting of the samples may be accomplished by spraying water directly on them or by moist air supplied by the humidifier 60 connected by a flexible tube 61 to the intake 62 of the blower 41, or other blowers, if desired.

Outlet vents 46 of all blowers are brought together and open into the duct 47 formed in the interior of the tube 40. The bottom of tube 40 is partially closed by a wooden strut member 48. This does not extend clear across the bottom of duct 47 but is shortened so as to provide the slot 50. The side 51 of duct 47 adjacent the slot 50 is extended downward below the lower face of the strut 48 and bent inwardly to form a lip 53 which forces air across the face of samples placed on the strut in the area 16 and indicated by the numeral **16*a*. In this way the samples are constantly cooled by a draft of ambient air blown across their surfaces, or by cooled and humidified air from humidifier 60. By use of the blowers furnishing an excess of air the surfaces, which are being tested, are kept very near the ambient temperature. Otherwise, because of concentration of the rays of the sun 10 directed as indicated by numeral 12**, the temperature of the samples would be raised to a point where the material to be tested on the surface of the sample, or, in a case of plastic being tested, the entire sample would be melted and perhaps destroyed.

Thus, the degrading and bleaching effects of the ultraviolet rays and white rays of the sun's light will produce their full effect but the sample will not be overheated, burned or destroyed.

Since it is shown that the mirror or reflecting area far exceeds the target testing area 16, the effect of the sun's rays is multiplied many times. This, of course, depends upon the aggregate area of the mirrors subject to such losses as are inherent in reflecting surfaces, and their different angles of reflection. By reason of this the time necessary to test any given group of samples is shortened. For example; material may be subjected to tests for one week and will be given sunshine equal to about two months' direct sun light, as it would impinge on the area 16 when exposed directly to the sun. Calculations can be made, taking into consideration the latitudinal position of the test apparatus, the season of the year, and the condition of the atmosphere which will establish a norm and can be used as a unit for comparatively measuring the exposure of materials to the sun. From this unit of measure the increased efficiency of the apparatus here shown can be calculated.

Experiments have proved that the results obtained are in accordance with the calculations which determine the norm of measurement, which represents in general the essential features of the mechanism. The mode of operation and location of the various components such as blowers, ducts, humidifiers, and drive may be varied by those familiar with the art to accomplish identical results.

It is to be understood that the humidifier 60, is intended to be made in any standard form and of commercial parts. A humidifier such as is mentioned may furnish either slightly damp, damp, or humid air, or even a dense fog. The tube 61 is flexible and may be placed in any convenient position so that it will not interfere with the movement of the blower 41 to which it is attached.

In addition to this means of wetting the samples a direct spray may be used. This is indicated in Figure 3 by numeral 64 which is connected through valve 65 to any convenient available source of water. The spray is directed on the sample in quantities so as to flood their surfaces but not in excess such as will run off onto the mirrors below the part 7. By regulating the flow the exact amount necessary to flood the surfaces of the samples may readily be obtained.

I claim:

Apparatus for concentrating solar rays on samples of material to be tested as to color fading, composed of a base supporting frame, a mirror-holding frame pivotally mounted on said base frame so that said mirror-holding frame may be adjusted on its axis according to its latitudinal position on the earth and according to the season of the year, a plurality of mirrors mounted on said mirror holding frame at angles so that the rays of the sun striking said mirrors will converge and concentrate above the mirrors on said frame, means for adjusting the angle of the axis of said pivotal support including mechanical means attached to one end of said pivotal support to raise and lower said end relative to a horizontal plane at the point where said base frame is mounted, mechanism for tilting said mirror frame on its pivotal supports to cause said frame, and the mirrors thereon, to follow the apparent movement of the sun from dawn until sunset, a target surface supported centrally above said mirror frame and having a narrow strip extending parallel to said axial supports of said frame and means for supporting samples of material to be tested on said target surface and mechanism for blowing ambient air over the surfaces of said samples to be tested in order to remove excess heat caused by the concentration of the orange, red and infra-red rays of the solar spectrum.

References Cited in the file of this patent

UNITED STATES PATENTS

| | | |
|---|---|---|
| 528,255 | Monks et al. | Oct. 30, 1894 |
| 1,951,404 | Goddard | Mar. 20, 1934 |
| 2,182,222 | Courtis et al. | Dec. 5, 1939 |
| 2,680,437 | Miller | June 8, 1954 |

FOREIGN PATENTS

| | | |
|---|---|---|
| 691,239 | Great Britain | May 6, 1953 |